United States Patent [19]
Brookes et al.

[11] Patent Number: 6,015,155
[45] Date of Patent: Jan. 18, 2000

[54] MOTOR VEHICLE SUSPENSION SYSTEM

[75] Inventors: Graham Robert Brookes, Redditch; David Andrew Clare, Solihull; Phillip James Green, Nuneaton; Richard John Smith, Coventry; Richard Graham Woodhouse, Birmingham, all of United Kingdom

[73] Assignee: Rover Group Limited, Warwick, United Kingdom

[21] Appl. No.: 08/863,237

[22] Filed: May 27, 1997

[30] Foreign Application Priority Data

Sep. 29, 1996 [GB] United Kingdom ............... 9611119

[51] Int. Cl.[7] .................................................. B60G 17/01
[52] U.S. Cl. .................................. 280/5.505; 280/5.504; 280/5.514; 280/6.155; 701/91
[58] Field of Search ....................... 280/5.505, 5.504, 280/5.514, 6.154, 6.155; 701/91

[56] References Cited

U.S. PATENT DOCUMENTS

| | | | |
|---|---|---|---|
| 4,930,807 | 6/1990 | Lachaize | 280/5.505 |
| 5,228,719 | 7/1993 | Fukuyama et al. | 280/5.505 |
| 5,364,122 | 11/1994 | Ichimaru . | |
| 5,430,647 | 7/1995 | Raad et al. . | |
| 5,452,919 | 9/1995 | Hoyle et al. . | |
| 5,517,414 | 5/1996 | Hrovat | 701/91 X |
| 5,627,751 | 5/1997 | Davis et al. | 280/5.504 X |

Primary Examiner—Christopher P. Ellis
Attorney, Agent, or Firm—David and Bujold

[57] ABSTRACT

A motor vehicle suspension system includes rear suspension units to adjust ride height between sprung and unsprung parts of the vehicle, control means for monitoring and maintaining ride height at a particular setting and wheel speed monitoring means for monitoring wheel speeds. The control means provides a corrective up height change signal in the event of an unrequested height change and there existed before the unrequested height change a wheel speed signal indicative of vehicle movement. The corrective height change signal may be applied to each suspension unit or the control means may monitor abnormal vehicle activity and provide the corrective height change signal to the appropriate suspension unit. One example of abnormal vehicle activity is when the wheel speeds differ significantly, the control means responding to provide the corrective height change signal to the suspensions unit on the side of the vehicle with the highest wheel speed. A second example of abnormal vehicle activity is where the suspension units use fluid pressure to support the vehicle and a difference in pressures before and after the unrequested height change is used to provide the corrective height change signal to the suspension unit on the side of the vehicle with the lowest suspension pressure.

21 Claims, 5 Drawing Sheets

MOTOR VEHICLE SUSPENSION SYSTEM

The invention relates to a suspension system for a motor vehicle. In particular it relates to a suspension system for a motor vehicle having front wheels and rear wheels, the suspension system comprising front suspension units for supporting vehicle weight on the front wheels and rear suspension units for supporting vehicle weight on the rear wheels, each suspension unit of at least one of the front suspension units and the rear suspension units being operative to adjust the ride height between sprung and unsprung parts of the vehicle adjacent to each operative suspension unit, and control means operatively connected to the operative suspension units for monitoring and maintaining each ride height at a particular setting.

In U.S. Pat. No. 5,452,919 it has been proposed to adapt the control means to provide for each operative suspension unit a respective up height change signal to increase the ride height, a respective down height change signal to decrease the ride height and to monitor the height change signals to detect the condition where the vehicle becomes at least partially supported by direct contact between the chassis and the ground. This condition is sometimes known as vehicle hang-up or belly-out. While the arrangement described in U.S. Pat. No. 5,452,919 is known to work well, it relies on the vehicle hang-up occurring before corrective action is taken so progress of the vehicle over rough terrain can be impeded.

It is an object of the present invention to provide a vehicle suspension system of the kind described which acts to make severe vehicle hang up less likely.

The present invention provides a suspension system for a motor vehicle having front wheels and rear wheels, the suspension system comprising front suspension units for supporting vehicle weight on the front wheels and rear suspension units for supporting vehicle weight on the rear wheels, each suspension unit of at least one of the front suspension units and the rear suspension units being operative to adjust the ride height between sprung and unsprung parts of the vehicle adjacent to each operative suspension unit, control means operatively connected to the operative suspension units for monitoring and maintaining each ride height at a particular setting and adapted to provide for each operative suspension unit a respective up height change signal to increase the ride height and a respective down height change signal to decrease the ride height, and wheel speed monitoring means for monitoring wheel speeds on at least two of said front and rear wheels, the control means being operative to provide a corrective up height change signal in the event of an unrequested height change which is not in response to a height change signal and there existed before the unrequested height change a wheel speed signal indicative of vehicle movement.

By monitoring wheel speeds it is possible to detect conditions under which vehicle hang-up is occurring. This enables the suspension system to take action as hang-up starts and progress of the vehicle over rough terrain is impeded less.

The corrective height change signal may be applied to each operative suspension unit. Alternatively, the control means may be operative to monitor abnormal vehicle activity and to provide the corrective height change signal to the appropriate suspension unit. For example, the wheel speed monitoring means may be operative to provide an abnormal wheel speed signal if the wheel speeds are outside predetermined wheel speed parameters as an indication of abnormal vehicle activity, the control means being responsive to the abnormal wheel speed signal to provide the corrective height change signal to the suspensions unit on the side of the vehicle with the highest wheel speed. The predetermined wheel speed parameters may comprise a predetermined difference in wheel speeds. The abnormal wheel speed signal may be provided by an electronic traction control means.

In a further example of the control means being operative to monitor abnormal vehicle activity and to provide the corrective height change signal to the appropriate suspension unit, the operative suspension units use fluid pressure to support the vehicle and the control means is operative to monitor the suspension pressure in each operative suspension unit and provide an abnormal suspension pressure signal as an indication of abnormal vehicle activity if suspension pressure is outside predetermined suspension pressure parameters, the control means being responsive to the abnormal suspension pressure signal to provide the corrective height change signal to the suspension unit on the side of the vehicle with the lowest suspension pressure. In this case the predetermined suspension pressure parameters may comprise a predetermined reduction in suspension pressure subsequent to the unrequested height change.

Preferably, the suspension pressures after the unrequested height change are averaged and compared with the averaged suspension pressures before the unrequested height change. Conveniently the suspension pressures are sensed by a single transducer. The predetermined suspension pressure parameters may also comprise a predetermined pressure difference between a suspension unit on one side of the vehicle and a suspension unit on the other side.

Preferably, the control means is responsive to a throttle open signal indicative of the depression of accelerator pedal or other driver controlled engine demand device and the corrective height change is inhibited in the absence of the throttle open signal at least until a further condition is met. Such a further condition may comprise a predetermined time lapse or the vehicle attaining a predetermined road speed. Furthermore, the control means maybe responsive to an engine low torque signal indicative of a low engine fuelling rate such that inhibition in the absence of a throttle open signal is applied only if a low torque signal exits. The inhibition of the corrective height change may be conditional on the absence of a wheel speed signal indicating that no wheels are rotating.

The invention also provides a motor vehicle incorporating a suspension system according to the invention.

Other aspects of the invention will be apparent from the appended claims and from the following description of the invention which is given by way of example and with reference to the accompanying drawings, of which:

Figure 1:
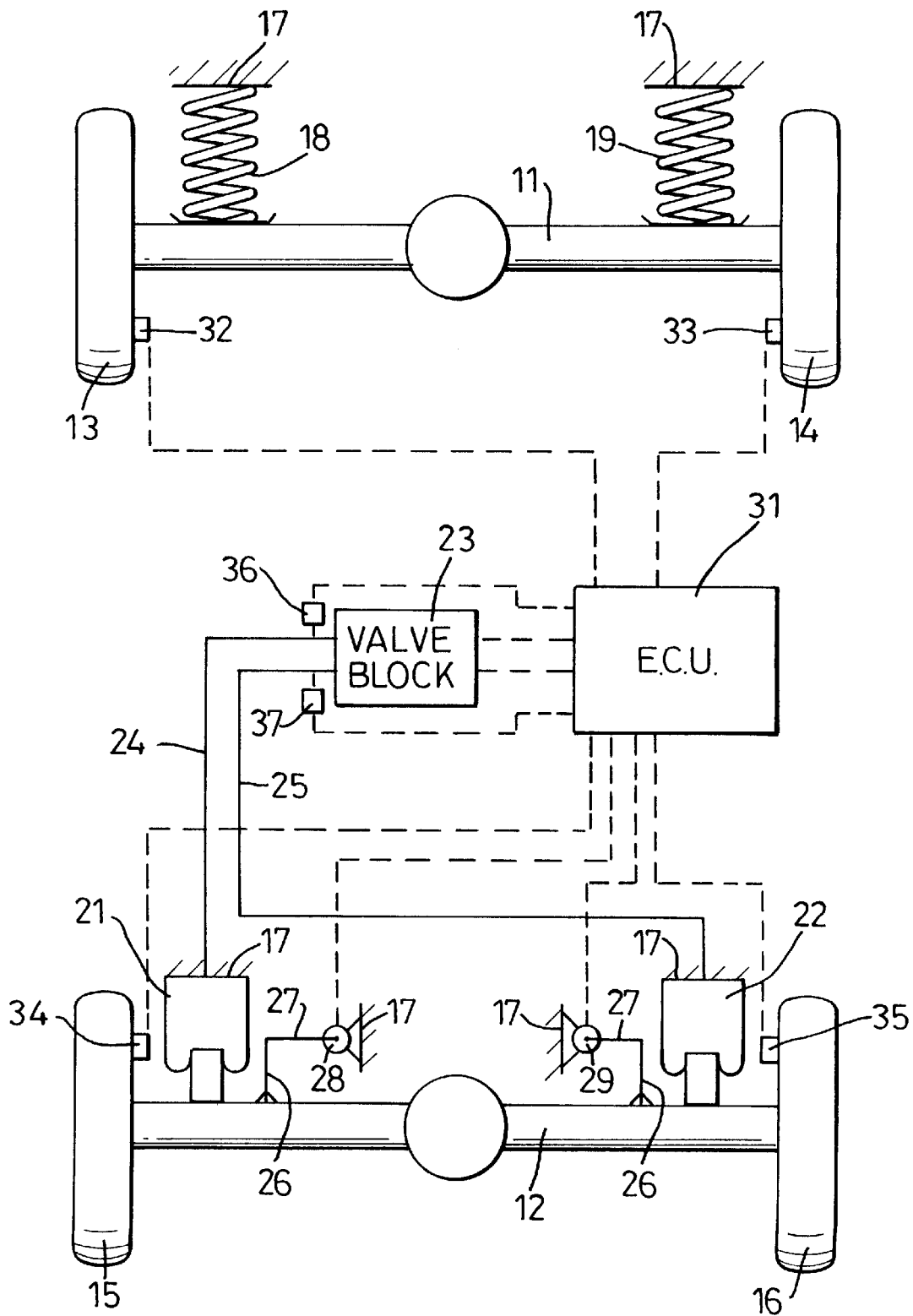
FIG. 1 is a schematic view of one example of a suspension system according to the invention.
Figure 2:
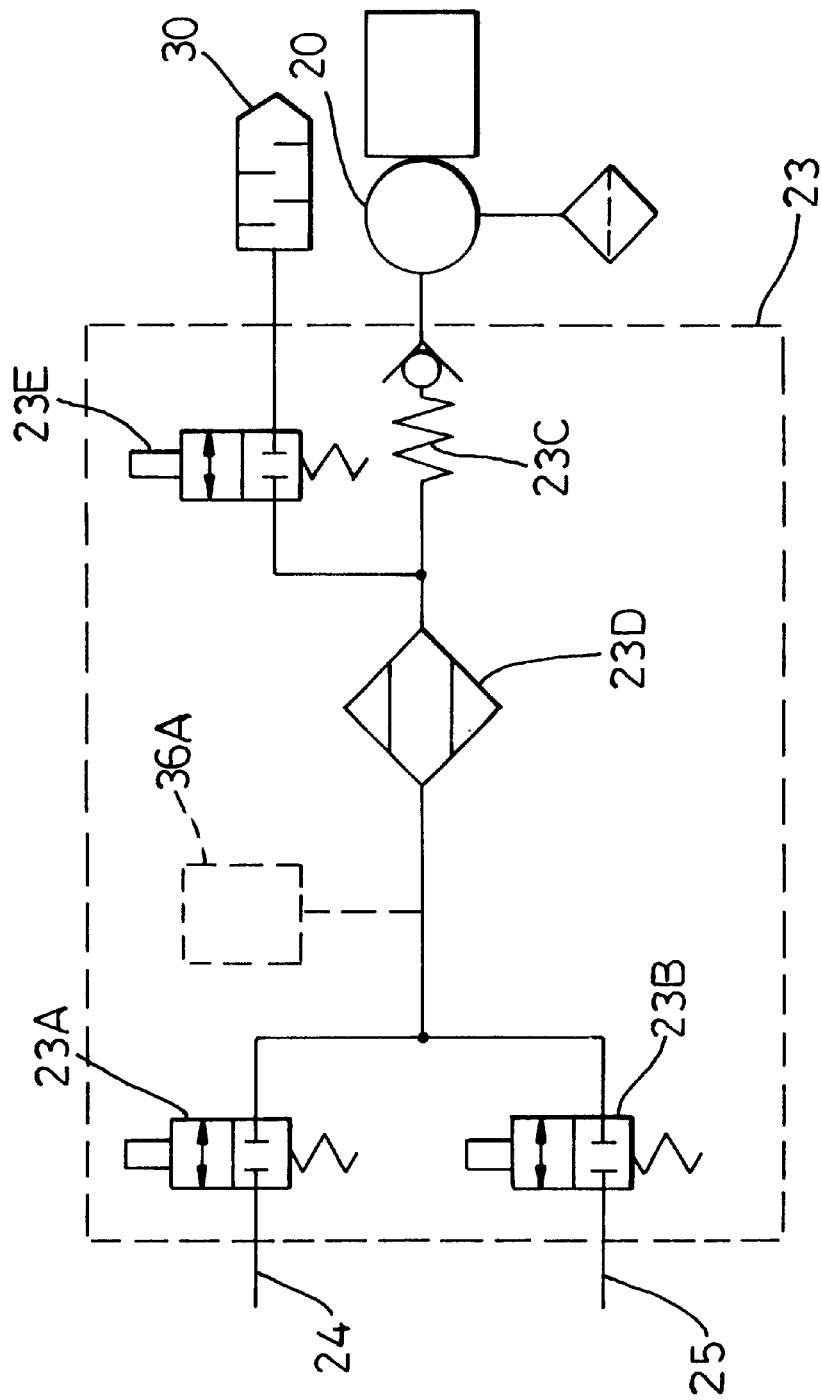
FIG. 2 is a diagram showing components of a valve block and ancillary items shown in FIG. 1.

Referring to FIGS. 1 and 2, there is shown a vehicle front axle 11 and a rear axle 12. Both axles 11, 12 are rigid driving axles and represent unsprung parts of the vehicle. The front axle 11 carries front wheels 13 and 14 and the rear axle 12 carries rear wheels 15 and 16.

A sprung part of the vehicle, represented diagrammatically as a body or chassis 17 has its weight supported by coil spring suspension units 18 and 19 connected between the chassis 17 and the front axle 11 and by air spring suspension units 21 and 22 connected to the rear axle 12.

Air pressure in the air springs 21 and 22 is controlled by a valve block 23 through individual pipes 24 and 25. The valve block 23 includes a two way solenoid valve 23A, 23B for each air spring 21 and 22 which can connect the respective air spring to a pressure source such as a motor driven compressor 20, to an exhaust to atmosphere 30 or isolate the respective pipe 24 or 25 so that the mass of air in each air spring remains constant. The compressor 20 supplies air through a non-return valve 23C and a regenerative dryer 23D and the exhaust 30 is controlled by a two-way solenoid valve 23E.

Mounted close to each air spring 21 and 22 is a link 26 to an arm 27 carried by a respective height sensor 28, 29 which gives a ride height signal indicative of the ride height between the sprung and unsprung parts of the vehicle adjacent the respective air spring 21, 22. Typically the height sensor 28, 29 is a rotary Hall-effect transducer or a rotary potentiometer.

Ride height can be adjusted or maintained at a particular setting by a control means comprising the solenoid valves 23A, 23B and 23E in the valve block 23, the compressor 20 and an electronic control unit (ECU) 31 which is connected to the solenoid valves and the compressor to control the emission or exhaust to and from each air spring 21, 22.

The height sensors 28 and 29 are connected to the ECU 31 to provide the ride height signals as described above. In addition the ECU 31 is also connected to wheel velocity transducers 32, 33, 34 and 35 on each wheel 13, 14, 15 and 16 which provide signals of wheel speed to the ECU. Provided optionally are two pressure transducers 36 and 37 in pipes 24 and 25 respectively which can provide a signal indicative of the pressure in each of the air springs 21 and 22. Alternatively, a single pressure transducer 36A may be provided in the passage between the solenoid valves 23A and 23B and the dryer 23D.

In normal use the ECU maintains the ride height at each air spring 21 and 22 within predetermined limits, i.e. a dead band, and with appropriate response damping to prevent unnecessary air consumption when the vehicle load is constant and the springs are performing their normal function of isolating the vehicle from the effects of the road surface.

Normal system response is undesirable under some driving conditions particularly some of those conditions which are likely to be encountered whilst driving "off-road", i.e. off normal paved roads. These would include situations where one or more wheels suffer reduced or no ground contact pressure, the vehicle hang-up or belly-out previously referred to. These situations occur, for instance, when the vehicle is crossing deep ruts or when reaching the crest of a steep hill. In these abnormal circumstances the ECU responds in the manner illustrated in FIG. 3. At 41 a height change 42 (as derived from the height sensors 28 and 29) is analysed. If the height change is not unrequested then the normal function of maintaining the ride height is continued at 43. On the other hand, if the height change is unrequested, then the ECU proceeds to analyse at 44 if there was a wheel speed signal prior to the height change. If there was no such wheel speed signal, then further height changes are inhibited at 45 since this indicates a situation where the vehicle is stationary and is perhaps being loaded or unloaded or that there are maintenance or repair functions being carried out on the vehicle.

If there does exist a wheel speed signal prior to the height change then the logic in the ECU proceeds to ask at 46 whether or not there is abnormal vehicle activity which would indicate which air spring should be inflated as indicated at 47. If such abnormal activity cannot be detected then both air springs are inflated as indicated at 48. In referring to inflation of the air springs, this would normally be effected by an increase in the datum height reference for the appropriate air spring so that the system would respond by moving to an increased ride height.

Figure 3:
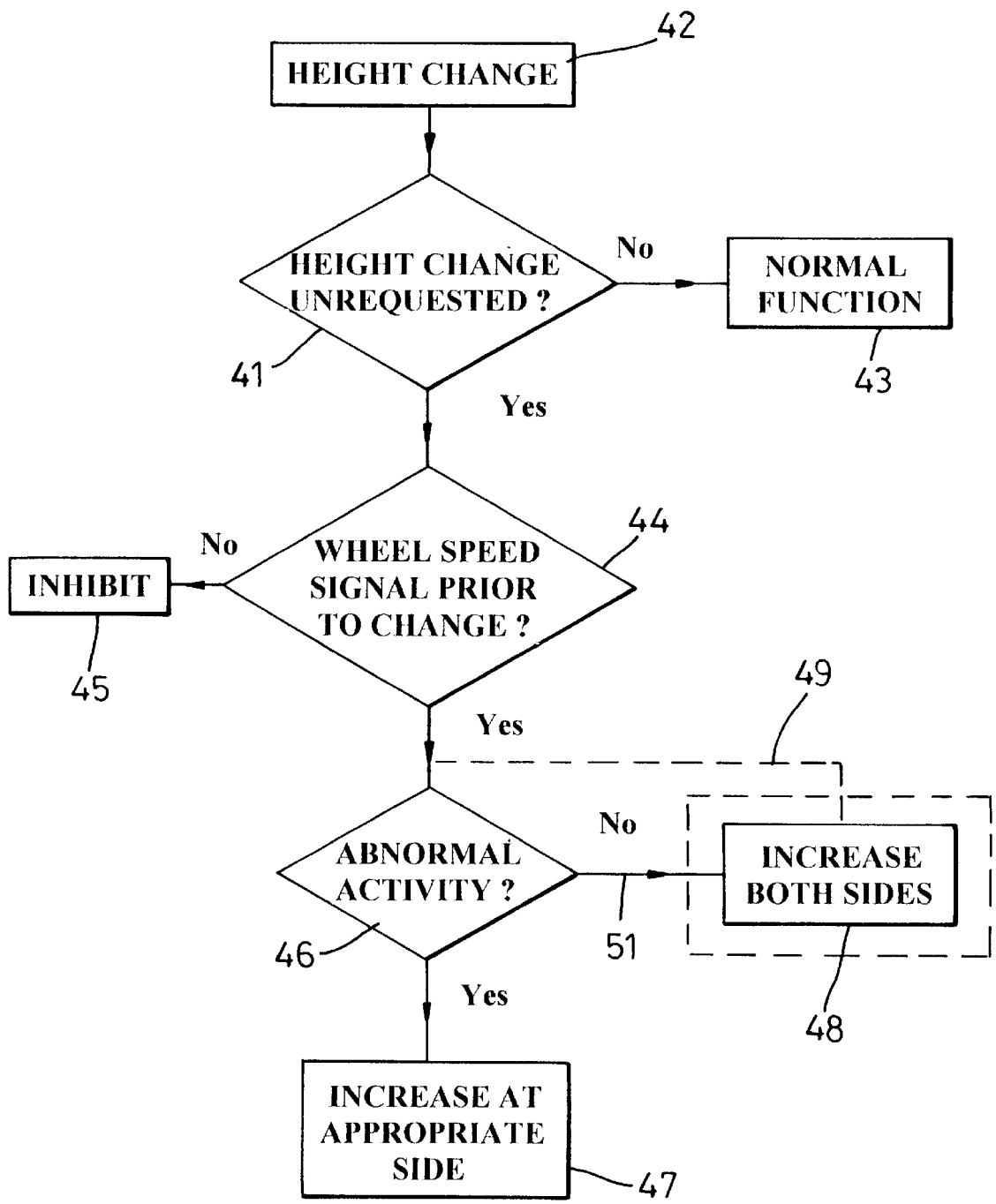
FIG. 3 is a logic diagram illustrating operation of a control means shown in FIG. 1.

In a modification to FIG. 3 (not shown) the system is simplified by omitting the abnormal activity query 46 so that if there is a wheel speed signal prior to a height change at 44 then the ECU 31 responds by increasing the ride height at both sides of the vehicle, as indicated by line 49.

One example of abnormal activity queried at 46 is differential wheels speed as determined by a difference between wheel speeds on one side of the vehicle and on the other, i.e. a comparison of the signal derived from the left hand front wheel speed transducer 32 with that derived from the right hand front wheel speed transducer 33 or a comparison of the signal derived from the rear wheel speed transducer 34 and that derived from the right hand rear wheel speed transducer 35. If there is a speed difference greater than a predetermined magnitude, the ECU proceeds at 47 to increase the ride height at the side of the wheel with the greater velocity.

The wheel speed transducers 32, 33, 34 and 35 are typically those used in an anti-lock brake control system (ABS) or an electronic traction control system (ETC). Hence it may be convenient to query for abnormal activity at 46 by detecting a signal from the ETC control system which itself may have an electronic control unit which is integrated with the ECU 31.

A further example of a query for abnormal activity at 46 is that there is a significant suspension pressure difference before and after an unrequested height change as detected by the optional pressure transducers 37 and 36. If such a pressure difference exists, i.e. if the difference is more than a predetermined amount, then the height is increased at the air spring with the lowest air pressure.

An increase in ride height which is not accompanied by a corresponding increase in suspension pressure is an indication of vehicle hang-up. In order to minimise the effects of normal suspension movements, it is preferable that the suspension pressures are all averaged both before and after the unrequested height change.

If a single pressure transducer 36A is used, the suspension pressures are sampled by alternately opening solenoid valves 23A and 23B, preferably whilst keeping the exhaust solenoid valve 23E closed and the compressor 20 idle.

A further comparison of suspension pressure is to compare the pressure on either side of the vehicle and, if there is a difference of more than a predetermined amount, to increase ride height at the side with the lowest pressure.

It will be appreciated that the queries for abnormal activity described above are not mutually exclusive and the control means can be designed to use any or all of them as appropriate.

Figure 4:
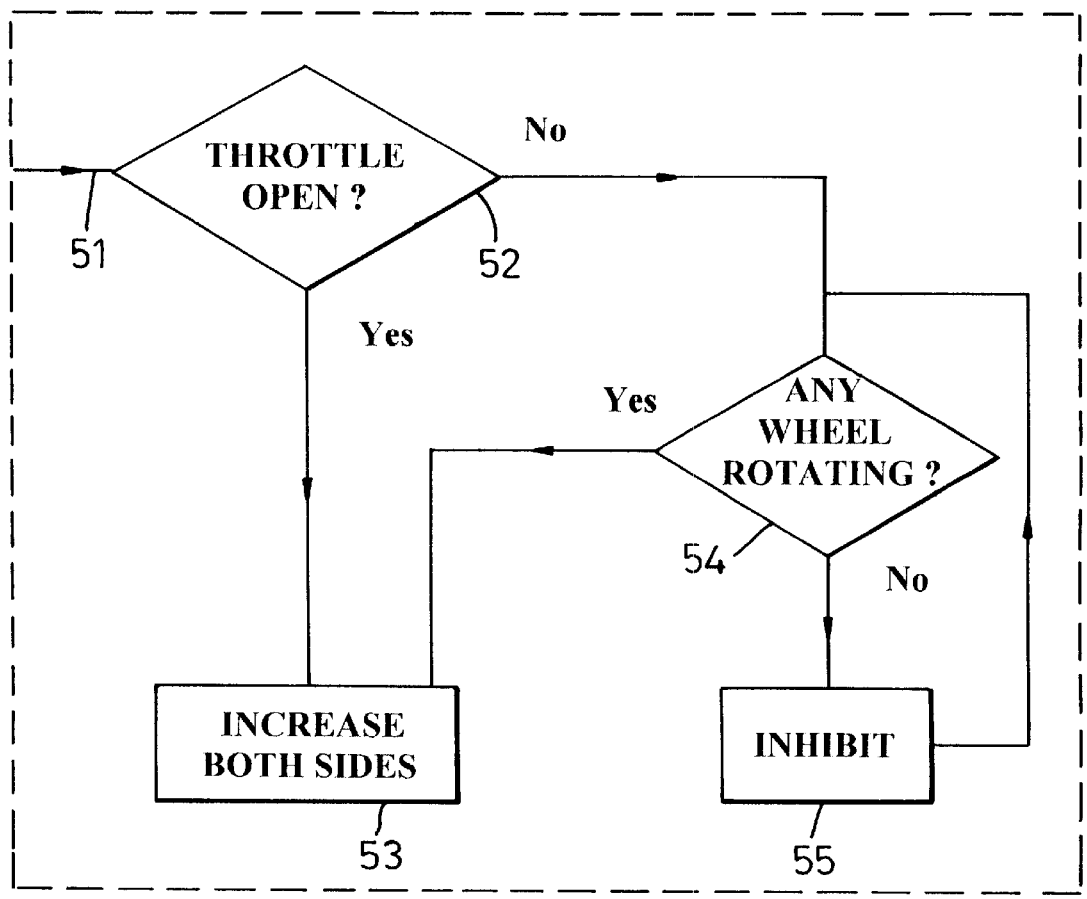
FIG. 4 is a flow diagram showing a first modification to the diagram shown in FIG. 3.

In a second modification illustrated by FIG. 4, instead of proceeding to increase the ride height at both sides at 48 if there is no abnormal activity at 46 (line 51), the ECU 31 queries whether or not there is a throttle open or driver demand signal as indicated at 52. Typically a throttle open/driver demand signal is derived from a potentiometer or micro-switch connected to an accelerator pedal. If a throttle open/driver demand signal exists, then the ECU 31 proceeds to increase the height at both sides of the vehicle at 53. On the other hand, if there is no throttle open/driver demand signal, the ECU 31 proceeds to query at 54 if any of the wheels 13, 14, 15 or 16 are rotating. If any wheel is rotating, this indicates that the vehicle is simply coasting or on the over-run and the ECU responds at 53 to increase the ride height at both sides. If there are no wheels rotating, an inhibit command is given at 55 to prevent further inflation or exhaust of the air springs. The inhibit signal at 55 is maintained for a set time or until the vehicle speed exceeds a predetermined threshold, e.g. 40 kilometres per hour. The set time may be in the range 1 to 20 minutes according to the vehicle type and anticipated driving conditions, 10 minutes being typical for a small sports utility vehicle with off-road capabilities.

Figure 5:
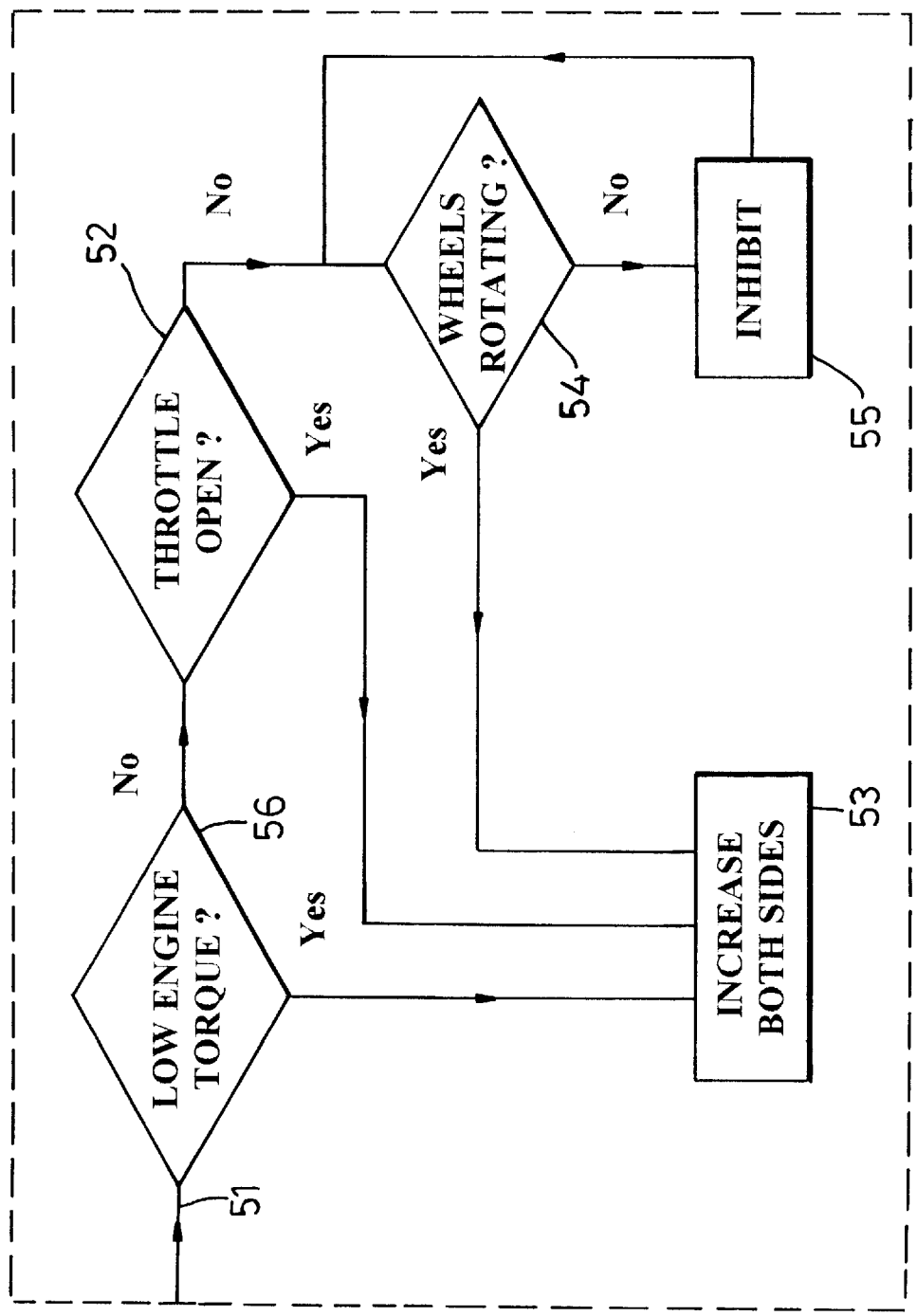
FIG. 5 is a flow diagram showing a second modification to the diagram shown in FIG. 3.

In the third modification, illustrated in FIG. 5, the arrangement described above with reference to FIG. 4 is modified by querying at 56 whether engine torque is below a certain magnitude. Engine torque can be derived from the engine management system, e.g. from the fuelling rate, or from a drive-by-wire accelerator pedal control system. If low engine torque is detected, the ECU 31 proceeds to increase the ride height on both sides at 53; if not, it proceeds to query at 52 whether or not there is a throttle open/driver demand signal as previously described.

Although described above in relation to an air suspension system which is on only one axle of the vehicle, invention is readily applied to a system where there are two or more axles fitted with air springs or where there is independent suspension.

Furthermore although an air suspension system has been described, the invention is also applicable to hydropneumatic suspension systems which employ gas springs or other hydraulic accumulators for the controlled suspension units and the suspension ride height is controlled by increasing or decreasing a volume of hydraulic fluid which supports the vehicle weight.

We claim:

1. A suspension system for a motor vehicle having front wheels and rearwheels, the suspension system comprising front suspension units for supporting a weight of the vehicle on the front wheels and rear suspension units for supporting the weight of the vehicle on the rear wheels, each suspension unit of at least one of the front suspension units and the rear suspension units being operative to adjust a ride height between sprung and unsprung parts of the vehicle adjacent to each operative suspension unit, control means being operatively connected to the operative suspension units for monitoring and maintaining each ride height at a particular setting for providing, as necessary each operative suspension unit with a respective up height change signal to increase the ride height and a respective down height change signal to decrease the ride height, and wheel speed monitoring means for monitoring wheel speeds on at least two of said front and rear wheels, the control means being operative to provide a corrective up height change signal in the event of an unrequested ride height increase which is not in response to a height change signal and there existed before the unrequested ride height increase a wheel speed signal indicative of vehicle movement.

2. A suspension system according to claim 1 wherein the corrective height change signal is applied to each operative suspension unit.

3. A suspension system according to claim 1 wherein the control means is operative to monitor abnormal vehicle activity and to provide the corrective height change signal to the appropriate suspension unit.

4. A suspension system according to claim 3 wherein the wheel speed monitoring means is operative to provide an abnormal wheel speed signal if the wheel speeds are outside predetermined wheel speed parameters as an indication of abnormal vehicle activity, the control means being responsive to the abnormal wheel speed signal to provide the corrective height change signal to the suspension unit on the side of the vehicle with the highest wheel speed.

5. A suspension system according to claim 4 wherein the predetermined wheel speed parameters comprise a predetermined difference in wheel speeds.

6. A suspension system according to claim 1 wherein each suspension unit of at least one of the front suspension units and the rear suspension units uses fluid pressure to support the vehicle; and the control means is operative to monitor the suspension pressure in each operative suspension unit and provide an abnormal suspension pressure signal as an indication of abnormal vehicle activity if suspension pressure is outside predetermined suspension pressure parameters, and is responsive to the abnormal suspension pressure signal to provide the corrective height change signal to the suspension unit on the side of the vehicle with the lowest suspension pressure.

7. A suspension system according to claim 6 wherein the predetermined suspension pressure parameters comprise a predetermined reduction in suspension pressure subsequent to the unrequested ride height increase.

8. A suspension system according to claim 7 wherein the suspension pressures after the unrequested height change are averaged and compared with the averaged suspension pressures before the unrequested ride height increase.

9. A suspension system according to claim 6 further comprising a single transducer to sense the suspension pressures.

10. A suspension system according to claim 6 wherein the predetermined suspension pressure parameters comprise a predetermined pressure difference between a suspension unit on one side of the vehicle and a suspension unit on the other side.

11. A suspension system according to claim 1 wherein the control means is responsive to a throttle open signal indicative of the depression of accelerator pedal or other driver controlled engine demand device and the corrective height change is inhibited in the absence of the throttle open signal at least until a further condition is met.

12. A suspension system according to claim 11 wherein said further condition comprises a predetermined time lapse.

13. A suspension system according to claim 11 wherein said further condition comprises the vehicle attaining a predetermined road speed.

14. A suspension system according to claim 11 wherein the control means is responsive to an engine low torque signal indicative of a low engine fuelling rate such that inhibition in the absence of a throttle open signal is applied only if a low torque signal exists.

15. A suspension system according to claim 11 wherein the inhibition of the corrective height change is conditional on the absence of a wheel speed signal indicating that no wheels are rotating.

16. A suspension system according to claim 6 wherein the control means is responsive to a throttle open signal indicative of the depression of accelerator pedal or other driver controlled engine demand device and the corrective height change is inhibited in the absence of the throttle open signal at least until a further condition is met.

17. A suspension system according to claim 16 wherein said further condition comprises a predetermined time lapse.

18. A suspension system according to claim 16 wherein said further condition comprises the vehicle attaining a predetermined road speed.

19. A suspension system according to claim 16 wherein the control means is responsive to an engine low torque signal indicative of a low engine fuelling rate such that inhibition in the absence of a throttle open signal is applied only if a low torque signal exists.

20. A suspension system according to claim 16 wherein the inhibition of the corrective height change is conditional on the absence of a wheel speed signal indicating that no wheels are rotating.

21. A suspension system for a motor vehicle having front wheels and rear wheels, the suspension system comprising a pair of front suspension units for supporting a portion of the weight of the vehicle on the front wheels and a pair of rear suspension units for supporting a portion of the weight of the vehicle on the rear wheels, each suspension unit of at least one of the front suspension units and the rear suspension units being operative to adjust a ride height between sprung parts and unsprung parts of the vehicle located adjacent to each operative suspension unit, a control mechanism being operatively connected to the operative suspension units for monitoring and maintaining each ride height at a particular setting and for providing for each operative suspension unit with a respective up height change signal, to increase the ride height, and a respective down height change signal, to decrease the ride height, as necessary, during operation of the vehicle, and a wheel speed monitoring mechanism for monitoring a speed of at least two of said front and rear wheels, and the control mechanism being operative to provide a corrective up height change signal, in the event of an unrequested ride height increase which is not in response to a height change signal when a wheel speed signal, indicative of movement of the vehicle, existed before occurrence of the unrequested ride height increase.

* * * * *